United States Patent
Gugel et al.

[11] Patent Number: 5,870,829
[45] Date of Patent: *Feb. 16, 1999

[54] PORTABLE POWERED HACK-SAW

[75] Inventors: Leslie Gugel; Joyce Gugel, both of Jupiter, Fla.

[73] Assignee: C-6 Products, Inc., Tequesta, Fla.

[ * ] Notice: The term of this patent shall not extend beyond the expiration date of Pat. No. 5,442,857.

[21] Appl. No.: 513,656

[22] Filed: Aug. 11, 1995

Related U.S. Application Data

[63] Continuation-in-part of Ser. No. 222,196, Apr. 4, 1994, Pat. No. 5,442,857, which is a continuation-in-part of Ser. No. 851,576, Mar. 16, 1992, Pat. No. 5,303,478.

[51] Int. Cl.[6] .................................................. B23D 49/12
[52] U.S. Cl. .................................. 30/392; 30/507; 30/513
[58] Field of Search ................................ 30/392, 166.3, 30/369, 507, 509, 513, 514, 517

[56] References Cited

U.S. PATENT DOCUMENTS

| | | | |
|---|---|---|---|
| 2,253,440 | 8/1941 | Martin | 30/513 |
| 3,807,471 | 4/1974 | Dreier | 30/513 |
| 3,840,059 | 10/1974 | Ingro | 30/514 |
| 4,253,365 | 3/1981 | Ragazzini | 30/392 |
| 4,262,420 | 4/1981 | Nalley | 30/392 |
| 4,458,421 | 7/1984 | Lew | 30/392 |
| 5,027,518 | 7/1991 | Adomatis | 30/392 |
| 5,303,478 | 4/1994 | Gugel | 30/392 |
| 5,313,709 | 5/1994 | Pabon-Delgado | 30/513 |
| 5,442,857 | 8/1995 | Gugel | 30/392 |

*Primary Examiner*—Hwei-Siu Payer
*Attorney, Agent, or Firm*—McHale & Slavin, PA

[57] ABSTRACT

A hack-saw that consists of a powered motor encased in a housing unit with a handle for gripping by the operator. Extending out from the top of the handle is an elongated bar which runs out forward from the motor housing unit to which depends a leg parallelly disposed relative to the motor housing. Extending out from the bottom of this leg is a rod, spring and nut assembly parallel in line to the elongated bar. One end of the metal hack-saw blade is removably attached to the rod, spring and bolt assembly and the other end of the blade is removably attached to the reciprocating output member of the motor extending out from the bottom of the motor housing which when running moves back and forth, causing a sawing motion. In another embodiment the rod, spring and nut assembly includes an anti-rotational structure to assure the hack-saw blade reciprocates aver a constant path of travel to avoid misalignment.

23 Claims, 5 Drawing Sheets

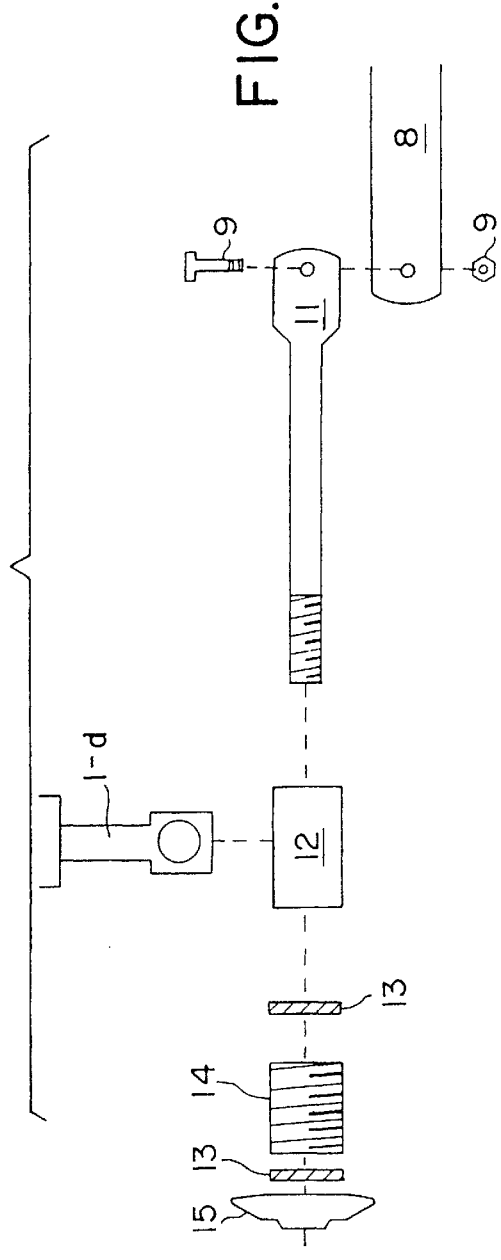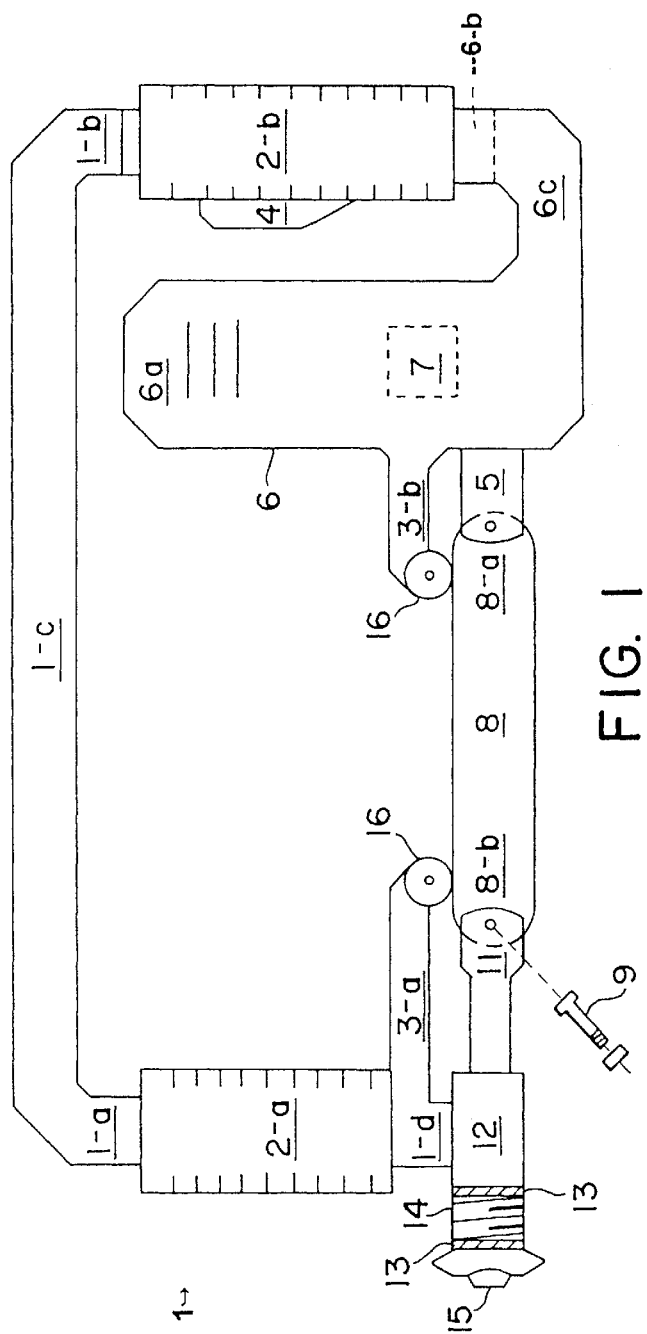

PORTABLE POWERED HACK-SAW

CROSS REFERENCE

This is a continuation-in-part of U.S. patent application Ser. No. 08/222,196 filed Apr. 4, 1994, now U.S. Pat. No. 5,442,857 which is a continuation-in-part of U.S. patent application Ser. No. 07/851,576 filed on Mar. 16, 1992, now U.S. Pat. No. 5,303,478.

TECHNICAL FIELD

This invention relates to hack-saws and more particularly to a hand-held portable powered hack-saw utilized for cutting.

BACKGROUND ART

As one familiar with cutting or sawing tools, the hack-saw is typically designed to be hand held and operated and compact in size for portable use. The only known device in use at present time that utilizes some sort of power which would come close in description to the present invention would be the portable band saw. This device, however, is bulkier in size, and consequently, heavier in weight, and implements a different method for cutting, i,e. a metal band attached to two common axes. While this device may be practical for cutting through larger sheets of metal, due to its size and weight, it is not practical for smaller operations such as cutting through metal or plastic pipe or for cutting bolts or screws. Additionally it is relatively expensive to purchase.

I have found that I can provide a lighter, more compact, and less costly cutting tool with the same basic purpose in mind. It is also adaptable to be cord operated powered by either available A.C. or D.C. electrical power of the type typically delivered to residential and commercial buildings and the like or operated by battery, hydraulic, or pneumatic powered motors.

SUMMARY OF THE INVENTION

An object of this invention is to provide a hand-held portable powered hack-saw where the source of power for powering the motor can be from a customary electrical AC or DC outlet, a battery, or a pneumatic or hydraulic system.

This device is a cutting device, or commonly referred to as a hack-saw consisting of a motor housing unit encased in a mainframe or casing fixedly mounted to or integrally formed frame supporting the outer end of a metal hack-saw blade having an inner end removably mounted to a reciprocally driven linkage connected to a motor contained in the casing. The metal hacksaw blade is to be used for cutting through objects intended to be cut, as for example metal, plastic pipes, wall board, wood and the like. The advantage to invention is that it allows for a much quicker and less tiring method for cutting through such objects, since it is the only power device of its kind providing a quicker forward and backward motion for cutting. Also due to its lighter size and fewer parts in assembly, it provides a more cost-effective means than other substitute devices available in the market today.

A feature of this invention is the spring loaded anti-rotational rod that attaches to the end of the removable hack-saw blade for preloading the blade and assist and resist the force generated by the motor.

A second embodiment of this invention is directed to the use of a hand held portable powered hacksaw which is operated by either pneumatic or hydraulic pressure. In this embodiment, a dual purpose motor mounted within the casing provides a reciprocally driven linkage allowing the hacksaw to operate in situations where electrical driven motors are impractical. This embodiment allows underwater operation. For instance, installation of pipe underwater requires cutting for proper configuration. A hacksaw operated by hydraulic pressure will allow operation without causing harm or disruption to the environment. Water is pressurized and delivered to an inlet of the tool. The spent water is exhausted locally without a need for return collection. In such a situation, a diver may use the hacksaw to efficiently cut objects without the associated interference such as typical cutting devices relying upon an air source or a cutting torch. A diver may not be concerned with movement caused by such tools known for their disruption in operation including the dangers posed to the diver. Operation of an underwater cutting torch produces temporary blind spots to the operator while an oxygen driven device creates uplifts debris due to the air bubbles capable of lifting matter.

The instant invention may also rely upon captured hydraulic pressure for operation wherein an inlet to the drive motor carries pressurized fluid and an exhaust port would provide return of the fluid to a holding tank. This is beneficial in those instances where cutting necessitates little or no vibration allowing the hydraulic fluid to dampen operation. Hydraulics allow for operation in otherwise dangerous situations such as those environments having explosive gases.

The use of the dual purpose hydraulic/pneumatic motor further allows for operation by pressurized air supplied by most conventional air compressors. In place of a hydraulic fluid intake, air is inserted into the hacksaw wherein the air operates the motor allowing for the reciprocal engagement of the hacksaw blade.

In these adverse conditions it is preferred that the distal end of the hacksaw blade is secured by a frictionless sleeve in place of the biasing spring. In this manner the motor performs the required push/pull reciprocating action.

Another objective of the instant invention is to provide a powered hacksaw having a motor capable of operating on a pneumatic or hydraulic source.

Still another embodiment of the instant invention is to disclose the use of a sleeve for maintaining the hacksaw blade in a slidable position with the primary push and pull force provided by a motor.

Thus an objective of the invention is to disclose a portable powered hacksaw that will operate on a rechargeable battery.

BRIEF DESCRIPTION OF THE DRAWINGS

FIG. 1 is a view in elevation depicting the invention;

FIG. 2 is a partial exploded view showing the details of the spring housing assembly of FIG. 1;

FIG. 5A is a cross sectional view of the blade attachment of the embodiment illustrated in FIG. 5; and FIG. 5B is a cross sectional view of a two blade attachment of the embodiment illustrated in FIG. 5;

BEST MODE FOR CARRYING OUT THE INVENTION

Figure 3:
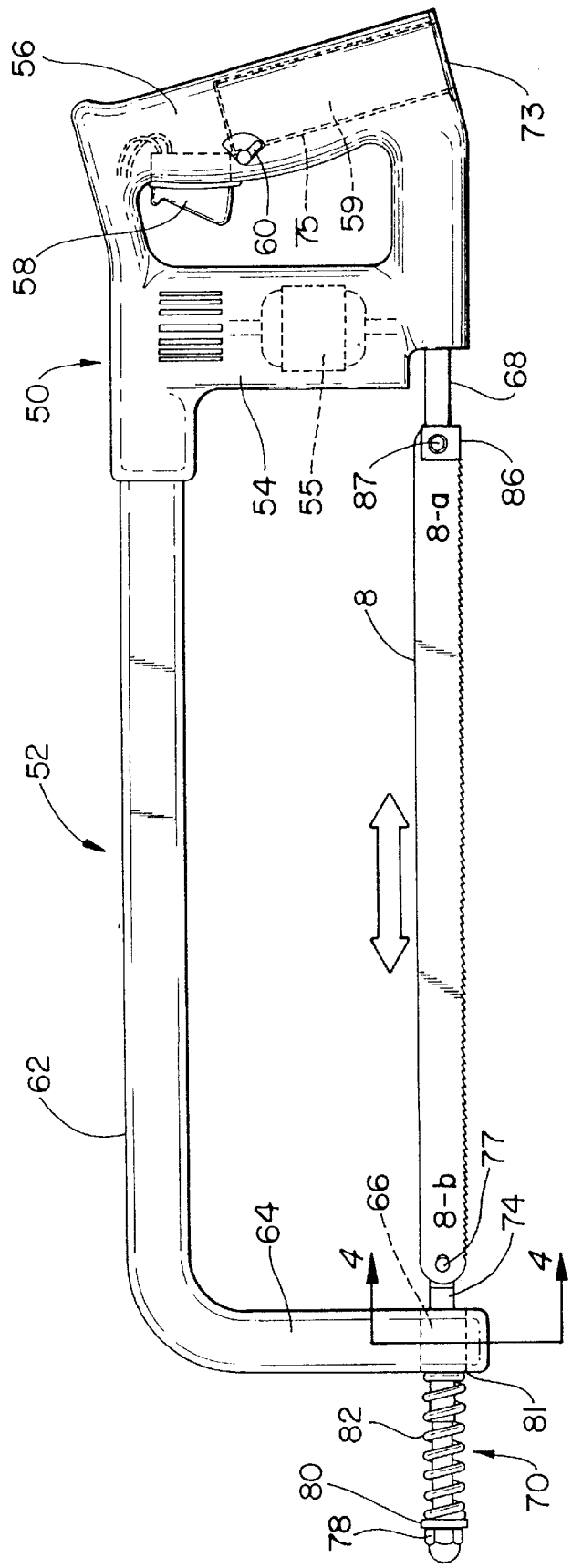
FIG. 3 is a view in elevation exemplifying another embodiment of this invention.

Referring to FIGS. 1 and 2 the c-shaped frame of the electric powered cutting saw is generally depicted by reference numeral 1. This frame being of ¼ inch thickness by 1 inch diameter iron stock can vary in diameter and thickness from 4 inches to 12 inches in height and 1 foot to 2 feet in length. Rubber grips 2-a and 2-b are of ½ to 1 inch diameter and are located on opposite sides of the c-shaped frame 1. Rubber grip 2-a is located on second leg 1-a of the c-shaped frame 1 with its base directly above roller arm 3-a. Rubber grip 2-b is mounted on second leg portion 6-b of u-shaped mainframe casing 6 and first leg portion 1-b of c-shaped frame 1. (since u-shaped casing 6, and c-shaped frame 1 are interconnected, they are both consequently mounted to the rubber grip 2-b).

On-off switch 4 is mounted to the second leg portion 6-b of the u-shaped casing 6 and is operable to connect the a.c. power to the electric motor 7 resulting in powering the reciprocating output shaft 5. Rubber grip 2-b has an opening to allow for on-off switch 4 to protrude and be accessible to the operator.

First leg 1-b of c-shaped frame 1 will be fixedly mounted within second leg 6-b of u-shaped casing 6 so that lateral portion 1-c of c-shaped frame 1 runs parallel with the hack-saw blade 8 and the second leg 1-a of the c-shaped frame 1 runs parallel with the first leg 6-a of the u-shaped casing mainframe 6. The u-shaped casing mainframe 6 consists of a first leg portion 6-a, a second leg portion 6-b, and a lateral portion 6-c. The lateral portion 6-c of the u-shaped mainframe casing 6 runs parallel with the lateral portion 1-c of the c-shaped frame 1. The first leg 6-a of the u-shaped casing 6 houses the motor means 7.

Motor means 7 is connected to a reciprocating output 5 which extends from the base of the u-shaped casing mainframe 6 and to which is attached the proximal end 8-a of the hack-saw blade 8 by means of a lock-nut and bolt 9. The hack-saw blade 8 will be approximately 10 inches to 17 inches, including a proximal 8-a and distal 8-b end, and being of a rigid main body incapable of supporting itself during sawing without its distal end 8-b being supported.

The spring means as shown consists of a first mount 11 which is inserted through the spring housing assembly 12. The threaded end of the first mount 11 is to be secured with a washer 13, a spring 14, a second washer 13, and a locking wing nut 15. The diameter of the first mount 11 is to be approximately 5/16 inch in diameter. At the base of the second end portion 1-d of the second leg 1-a of the c-shaped frame 1, there will be a hole. The hole opening is to run parallel with the lateral portion 1-c of the c-shaped frame 1 and is to allow for insertion of the housing assembly 12 so that housing assembly 12 is reciprocally and removably mounted to the base of the second end portion 1-d of the c-shaped frame 1. At the end of the first mount 11 opposite the threaded end, there will be a hole for which to mount the distal end 8-b of the hack-saw blade 8 by means of a lock-nut and bolt 9. The length of the first mount 11 and the length of the spring 14 will be determined by the length and specifications of the saw blade 8. Wing nut 15 will be tightened snugly so as to leave spring 14 with ample release motion.

There are, as indicated in FIGS. 1 and 2, two outwardly extending roller arms 3-a and 3-b which are present to maintain stability of the hack-saw blade 8 while it is moving. Roller arm 3-a is an outwardly extending arm fixedly mounted at the base of the second end portion 1-d of the c-shaped frame 1 directly above the spring housing assembly 12 and extending out parallel in line with the lateral portion 1-c of the c-shaped frame 1 and the hacksaw blade 8. To the end of the roller arm 3-a is attached a roller 16 which comes in contact with the hack-saw blade 8 while it is connected at the distal end 8-b. The roller arm 3-b is an outwardly extending arm fixedly mounted at the base of the first leg 6-a of the u-shaped mainframe casing 6 directly above the reciprocating output 5 and extending out parallel in line with the lateral portion 1-c of the c-shaped frame 1 and the hack-saw blade 8. To the end of the roller arm 3-b is attached a roller 16 which comes in contact with the hack-saw blade 8 while it is connected at the proximal end 8-a. The rollers 16 are rotatably mounted to the roller arms 3-a and 3-b.

Spring housing assembly 12, shown in FIG. 2, consists of the first mount 11, the lock-nut and bolt 9, the washers 13, the spring 14, and the locking wing nut 15. The illustration shows how the spring housing assembly 12 mounts to the base of the second end portion 1-d of the c-shaped frame 1, and how the first mount 11 is connected to the distal end 8-b of the hack-saw blade 8 and also secured to the spring housing assembly 12 by the means of the spring 14, washers 13, and locking wing nut 15.

For the sake of understanding how the spring housing assembly 12 is inserted through the base of the second end portion 1-d of the c-shaped frame 1, a front view of the lower half of the second leg 1-a of the c-shaped frame 1 is shown in FIG. 2.

The electric motor 7 housed within the grounded u-shaped mainframe or casing 6 may be, say, 120 volts a.c. and, say, rotates at 3200 rpm's. Also the motor 7 shall be double insulated at 2.2 amps.

Figure 4:
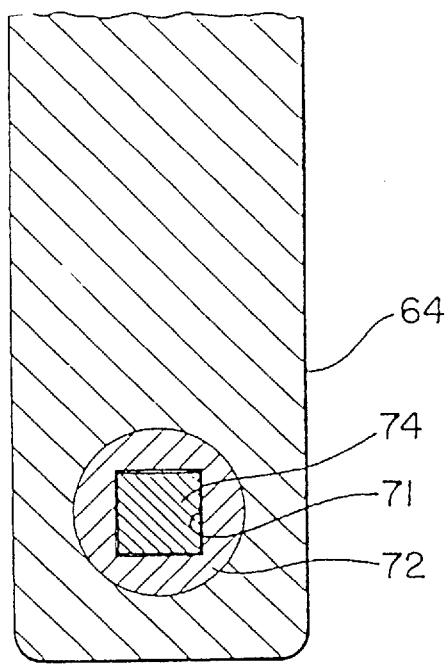
FIG. 4 is a sectional view taken through lines 4—4 of FIG. 3.

Another embodiment of this invention is exemplified in FIGS. 3 and 4 as comprising main housing generally indicated by reference numeral 50 and blade support frame generally indicated by reference numeral 52. The main housing 50 includes a main body or case 54 adapted to house the motor 55. A suitable handle 56 axially extends from end of the case 54 to allow the operator to hold the hack-saw in one hand. Battery 59 fits into compartment 75 formed in handle 56 and is a cartridge that is inserted through a door 73 formed on the bottom of handle 56. A suitable and commercially available switch 58 is conveniently supported to and projects from the handle to be engaged by the operator for engaging the switch connectors for connecting the motor to the power source (battery 59) so as to turn the powered hack-saw on and off.

Figure 5:
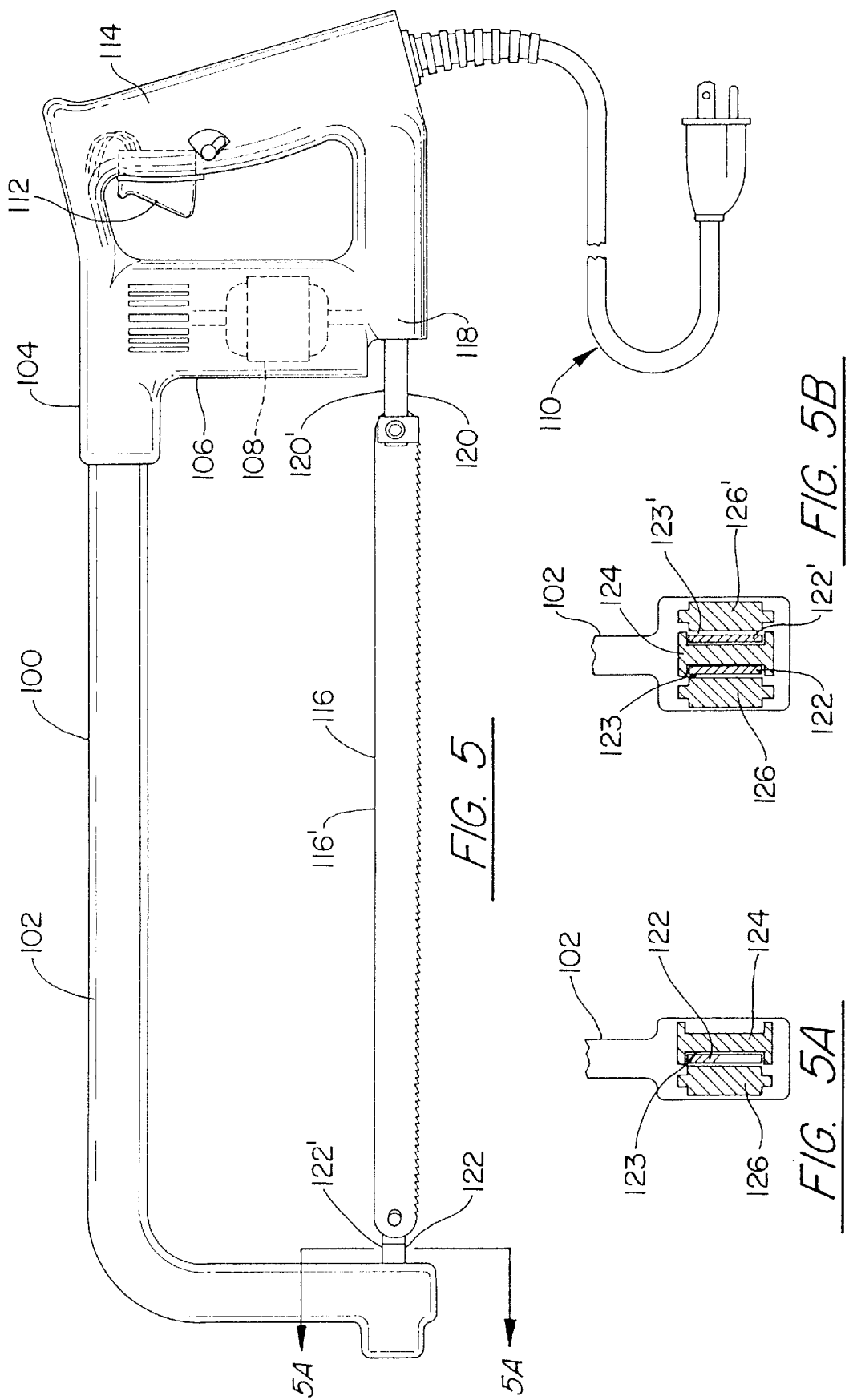
FIG. 5 is a side elevation view illustrating a second embodiment of this invention.

Referring to FIGS. 5 and 5A, shown is a second embodiment of the invention in which the distal end of the hacksaw blade utilizes a sleeve for support of the blade. This embodiment is illustrated by hacksaw 100 having a blade support frame generally indicated by reference numeral 102. A main housing 104 includes a case 106 adapted to house a motor 108 which, by way of illustration, operates on alternating current provided by attachment cord 110. Operation of the motor is performed by depressing switch 112 which is incorporated into handle grip 114. Hacksaw blade 116 obtains reciprocating motion by relying upon the motor means thus eliminating the need for a reciprocating spring on the distal end. Alternatively, a spring may be placed along the proximal end 118 of the blade via attachment bar 120, but is not necessary if a suitable gear mechanism allows for such operation.

In this manner, the use of this spring is eliminated in operation of the hacksaw in a push/pull mode performed by the motor means.

The distal end of the blade 116 is coupled to support housing by a blade coupler 122 that translates within a frictionless sleeve 123 or passageway formed between rollers 124,126. The rollers 124,126 resist motion of the blade 116 in directions which are transverse to the major axis of the blade. A preferred embodiment is the use of an I-shaped roller 124 having an enlarged upper and lower section spaced apart to allow for the insertion of a flat blade coupler 122 therebetween. The second roller 126 has an enlarged middle portion which fits within the first roller's spaced apart portions thereby engaging a side surface of blade coupler 122. In light of the size of roller 124, pressure placed on the bottom of blade 116 during cutting action forces the blade coupler 122 against the enlarged upper section of the roller 124 which is frictionally driven by the blade 116. As a result, the blade 116 and the roller 124 move at substantially the same speed. The roller 124 rotates about the major axis thereof, while the blade 116 translates along the major axis of the blade. The distal end of the blade 116 is slidably attached to the support frame 102 via the blade coupler 122.

In an additional embodiment, shown in FIG. 5B, a second hacksaw blade 116' is oriented parallel to the first hacksaw blade 116, within an alternate version of support frame 102. The blades 116,116' are attached to the motor 108 via a gear mechanism (not shown) so that while one blade is being pushed, the other blade is being pulled. In this embodiment, the distal end of each blade 116,116' is coupled to the support frame 102 by blade couplers 122,122' that translate within frictionless sleeves 123,123' or passageways formed between the rollers 124,126, and 126'. The rollers 124,126, and 126' resist motion of the blade 116 in directions which are transverse to the major axis of the blade. Roller 124 is I-shaped, having an enlarged upper and lower section spaced apart to allow for the insertion of blade couplers 126,126' therebetween. The second and third rollers 126,126' each have an enlarged middle section that fits between the spaced-apart sections of the first roller 124. So positioned, the rollers 124,126, and 126' are juxtaposed against respective side surfaces of the blade couplers 122,122'. In light of the size of roller 124, pressure placed on the bottom or cutting edges of the blades 116,116' during cutting forces the blade couplers 122,122' against the enlarged upper section of the roller 124 which is frictionally driven by the blade 116,116'. As a result, the blades 116,116' and the roller 124 move at substantially the same speed. The roller 124 rotates about the major axis thereof, while the blades 116,116' translate along the major axis of the blades. The distal end of each blade 116,116' is slidably attached to the support frame 102 via a blade coupler 126,126'.

Figure 6:
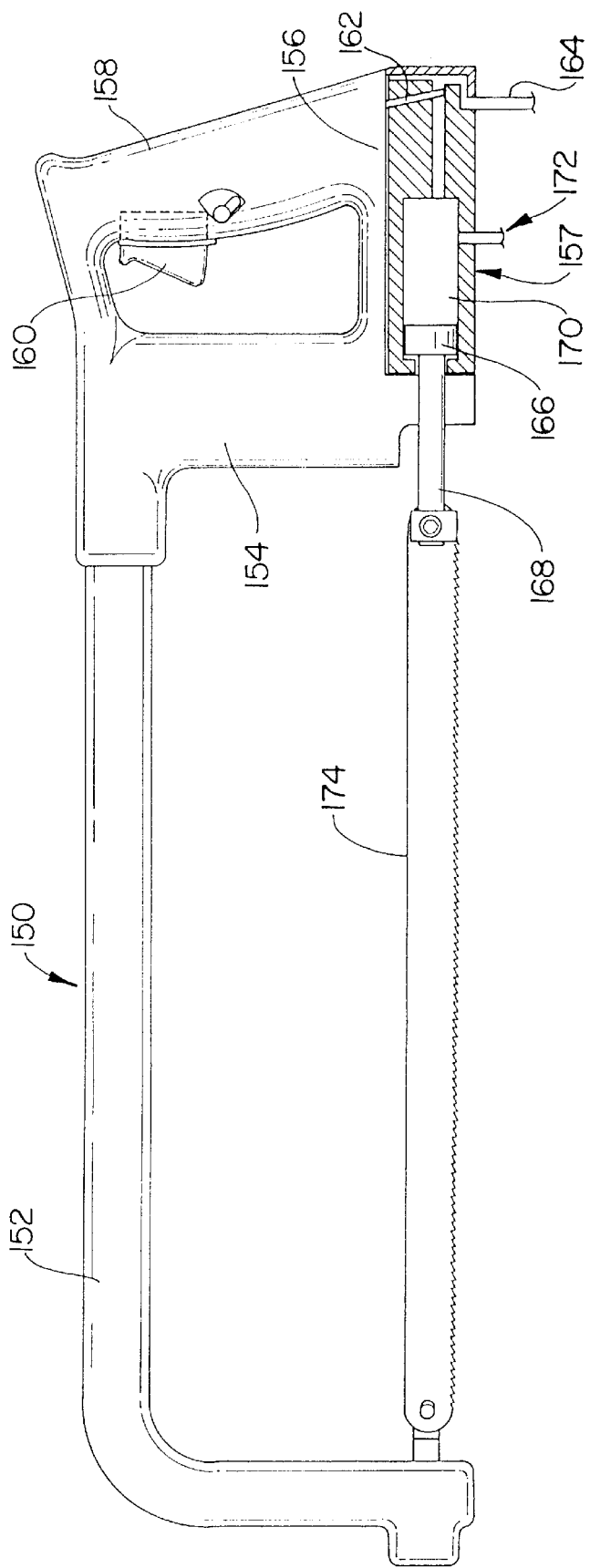
FIG. 6 is a view in elevation exemplifying another embodiment of this invention in partial cross-section.

Referring to FIG. 6, shown is an embodiment of the present invention in which fluid or gas pressure is used by a hydraulic/pneumatic motor means to drive the hacksaw blade.

The hacksaw 150 consists of a blade support frame generally indicated by reference numeral 152 and a main housing 154 adapted to house the motor means 156 and piston housing 157. A reciprocating type motor is placed in a horizontal position along casing 154 for positioning of direct drive cylinders. Handle 158 allows the operator to grasp the tool in one hand with switch 160 for use in controlling the motor means. Depressing of the switch 160 opens valve 162 admitting compressed fluid or air through the inlet 164 coupled to the tool by a quick connect or the like detachable fitting. Fluid passes diaphragm 162 and flows into the cylinder 170. As fluid continues to flow into the cylinder 170, the fluid forces the piston 166, which is coupled to the reciprocating rod 168, away from the diaphragm 162. As the piston 166 passes the fluid outlet 172, the fluid is exhausted from the cylinder 170. The diaphragm 162 then tilts back and the cycle begins again thus precipitating the reciprocal action of the hacksaw blade 174.

Alternatively, a vein type motor may be substituted for the above described embodiment. It should be noted that in the event hydraulic fluid is used to drive the present invention, the outlet 172 may be coupled with an outlet hose (not shown) which would return the hydraulic fluid after use. It should also be noted that in the event the invention is used in such a way that the fluid of the invention is the same as the ambient fluid, an outlet hose would not be necessary.

It is to be understood that while I have illustrated and described certain forms of our invention, it is not to be limited to the specific forms or arrangement of parts herein described and shown. It will be readily apparent to those skilled in the art that various changes may be made without departing from the scope of the invention and the invention is not to be considered limited to what is shown in the drawings and described in the specification. A safety lever 60 mounted on the handle and suitably connected to the switch 58 serves to prevent the switch from being turned on inadvertently.

The blade support frame 52 may be attached to the upper portion of the case 54, as shown, or may be integrally formed with case 54 and defines therewith a U-shaped portion with main housing 50. The case 54 is preferable made from a suitable, commercially available plastic material and the blade support frame may be made from either a suitable metal or plastic material. The elongated axially extending portion 62 extends parallel to the hack-saw blade 8 (like parts depicted in all the Figs. bear the same reference numerals) and the depending leg 64 extends parallel to the case 54 and includes an aperture 66 whose center line aligns with and is in coincidence with longitudinal axis of the reciprocating rod 68 suitably driven by the motor 55. The spring and support assembly generally indicated by reference numeral 70 fits into aperture 66 formed in the bottom end of depending leg 64 for supporting the distal end 8-b of hack-saw blade 8. Spring and support assembly 70 consists of bushing 72 having a square or rectangular slot 71 extending axially therethrough for supporting the rod 74 for reciprocating movement. The cross section of fore portion of rod 74 is rectangularly or square shaped and complements the shape of slot 71 which serves as an anti-rotation mechanism to assure that the hack-saw blade runs through when in operation. The fore end of rod 74 is milled or sliced to accommodate the attachment for the distal end 8-b of hack-saw 8. Suitable attaching means such as screw 77 serves to attach the hack-saw blade thereto. The aft end of rod 74 is cylindrically shaped and threaded to receive a nut 78. Washer or spring retainer 80 is suitably attached to the threaded end of rod 74. Coil spring 82 is disposed between the spring retainer 80 and the back face 81 of depending leg 64.

As is apparent from the foregoing, when the hack-saw blade 8 is driven toward the motor spring 82 is compressed and when the hack-saw blade 8 moves in the opposite direction spring 82 releases its energy and expands, always placing some load on the hack-saw blade 8. Tightening or loosening nut 78 serves to contract or expand the spring 82 so as to put the proper pre-load on the hack-saw blade. Also, by pushing on the rod 74 toward the case 54 compresses the spring which, in turn, releases the load on the hack-saw blade and allows the easy removal or insertion thereof.

The cross section of the reciprocating rod 68, which is the output of motor 55, is contoured similar to the cross-section of the fore end of the rod 74. This has a dual purpose of accepting U-shaped collar 86 and the affixed securing screw 87 to attach the proximal end 8-a of the hack-saw blade 8 to the end of rod 68 and to serve as an anti-rotation mechanism similar to the anti-rotational feature associated with the fore end of rod 74.

What is disclosed by this invention is a hand-held portable hack saw that is adapted to be electrically (cord or battery), pneumatically or hydraulically powered, with an axial loading mechanism to load the reciprocating hack-saw blade in both the fore and aft directions.

We claim:

1. A portable powered hack-saw comprising:
   a case,
   a motor housed in and supported by said case and having a reciprocating output means extending through said case,
   a hack-saw blade removably mounted to said reciprocating output means, said hack-saw blade including a proximal end and a distal end, said hack-saw blade including a main body incapable of supporting itself during sawing without said distal end being supported,
   support frame means extending outwardly from said case,
   said support frame means having a depending leg with an end portion thereon and a lateral portion extending between said depending leg and said case with said lateral portion spaced apart from and parallelly disposed relative to said hack-saw blade,
   spring and support assembly means attached to said end portion of said depending leg for supporting said distal end of said hacksaw blade and to axially load said hack-saw blade so as to force and resist movement of said hack-saw blade in a direction opposite to forced movement of said hack-saw blade by said motor,
   said spring and support assembly means including mount means reciprocally supported in an aperture formed in said end portion of said depending leg, said distal end of said hack-saw blade being removably connected to said mount means,
   said spring and support assembly means further including spring means operably connected to said mount means to push said mount means and said hack-saw blade in a direction towards said motor but yieldable to allow said motor to push said mount means and said hack-saw blade away from said motor,
   and a handle extending from said case adapted to be gripped by an operator to permit said portable powered hack-saw to be held in one hand of an operator.

2. A portable powered hack-saw as claimed in claim 1 wherein said mount means is a first rod having a longitudinal axis and said output means includes a second rod aligned coaxially with said longitudinal axis of said first rod.

3. A portable powered hack-saw as claimed in claim 2 wherein the contour of said first rod reciprocating in said aperture complements the shape.-of said aperture so that the hack-saw blade reciprocates along a constant path of travel.

4. A portable powered hack-saw as claimed in claim 3 wherein said first rod includes a threaded portion and a locking nut threadably engaging said threaded portion.

5. A portable powered hack-saw comprising:
   a case,
   a motor housed in and supported by said case and having a reciprocating shaft driven by said motor extending through said case,
   a handle extending from and formed in said case adapted to be gripped by an operator so as to hold said portable hack-saw in one hand,
   a hack-saw blade removably attached to said reciprocating shaft of said motor for reciprocal motion, said hack-saw blade including a proximal end and a distal end, said hack-saw blade, including a main body incapable of supporting itself during sawing without said distal end being supported,
   support frame means extending outwardly from said case and defining with said case a U-shaped member,
   said U-shaped member having a depending leg with an end portion thereon and a lateral portion extending between said depending leg and said case with said lateral portion spaced apart from and parallelly disposed relative to said hack-saw blade,
   support assembly means attached to said end portion of said depending leg for supporting said distal end of said hack-saw blade,
   said support assembly means including a rod reciprocally supported in an aperture formed in said end portion of said depending leg, said distal end of said hack-saw blade being removably connected to said rod,
   said support assembly means further including resilient and flexible means operably connected to said rod to apply a force to said rod and said hack-saw blade in a direction towards said motor but yieldable to allow said motor to push said rod and said hack-saw blade away from said motor,
   a source of power,
   and switch means mounted in said handle extending therethrough to interconnect said motor and said power for actuating said hack-saw to on and off positions.

6. A portable powered hack-saw as claimed in claim 5 wherein the contour of said rod reciprocating in said aperture complements the shape of said aperture so that the hack-saw blade reciprocates along a constant path of travel and is prevented from misalignment.

7. A portable powered hack-saw as claimed in claim 6 wherein said rod includes a threaded portion and a resettable nut threadably engaging said threaded portion at one end of said rod.

8. A portable powered hack-saw as claimed in claim 7 including a bushing mounted in said aperture for supporting said rod for reciprocal motion.

9. A portable powered hack-saw as claimed in claim 5 wherein said flexible and resilient means is spring means.

10. A portable powered hack-saw as claimed in claim 9 wherein said spring means is a coil spring.

11. A portable powered hack-saw as claimed in claim 5 wherein said source of power is a battery removably fitted into a compartment formed in said case.

12. A portable powered hacksaw comprising:
    a case,
    a motor means housed in and supported by said case and having a reciprocating output extending through said case,
    a first hacksaw blade removably mounted to said reciprocating output of said motor means for reciprocal motion, said hacksaw blade including a proximal end and a distal end, said hacksaw blade including a main body incapable of supporting itself during sawing without said distal end being supported,
    support frame means extending outwardly from said case,
    said support frame means having a depending leg with an end portion thereon and a lateral portion extending between said depending leg and said case with said lateral portion spaced apart from and parallelly disposed relative to said hacksaw blade, blade support means attached to said end portion of said depending leg for supporting said distal end of said hacksaw blade so as to accommodate axial reciprocation of said hacksaw blade, said blade support means providing for the reciprocation of said distal end of said hacksaw blade which is removably connected to said blade support means, said blade support means disposed in an aperture that perforates said end portion of said depending leg, said blade support means including an aligning means shaped to accommodate said blade support means so that said hacksaw blade reciprocates along a constant path of travel, a source of power, and a handle extending from said case adapted to be gripped by an operator to permit said support frame means to be held in one hand of the operator.

13. The portable powered hacksaw according to claim 12 wherein said alignment means is rotatable for placing said hacksaw blade at an angle.

14. The portable powered hacksaw according to claim 12 including a blade coupler disposed within said aperture, said blade coupler contoured to move within said aperture, whereby said hacksaw blade reciprocates along a constant path of travel.

15. The portable powered hacksaw according to claim 14 wherein said aligning means is defined as a frictionless sleeve having a sufficient length allowing said hacksaw blade to reciprocate along a constant path of travel.

16. The portable powered hacksaw according to claim 14 wherein said aligning means is defined as a roller disposed on each side surface of said blade coupler allowing said hacksaw blade to reciprocate along a constant path of travel.

17. The portable powered hacksaw according to claim 12 wherein said motor means operates on alternating current.

18. The portable powered hacksaw according to claim 12 wherein said motor means operates on compressed air or fluid.

19. The portable powered hacksaw according to claim 12 including a second hacksaw blade juxtaposition to and operatively associated with said first hacksaw blade providing a reciprocal motion in relation to said first hacksaw blade.

20. A portable powered hacksaw comprising:

a case, a hydraulic/pneumatic motor means housed in and supported by said case and having a reciprocating output extending through said case, a first hacksaw blade removably mounted to said reciprocating output of said motor for reciprocal motion, said hacksaw blade including a proximal end and a distal end, said hacksaw blade including a main body incapable of supporting itself during sawing without said distal end being supported, support frame means extending outwardly from said case having a depending leg with an end portion thereon and a lateral portion extending between said depending leg and said case with said lateral portion spaced apart from and parallelly disposed relative to said hacksaw blade, blade support means attached to said end portion of said depending leg for supporting said distal end of said hacksaw blade so as to accommodate axial reciprocation of said hacksaw blade, said blade support means providing for the reciprocally of said distal end of said hacksaw blade which is removably connected to said blade support means, said blade support means having a rotatable frictionless sleeve of sufficient length which compliments the shape of an aperture that perforates said end portion of said depending leg so that said hacksaw blade reciprocates along a constant path of travel, and a handle extending from said case adapted to be gripped by an operator to permit said support frame means to be held in one hand of the operator.

21. The portable powered hacksaw according to claim 20 wherein said sleeve includes a roller disposed on each side surface of a blade coupler allowing said hacksaw blade to reciprocate along a constant path of travel.

22. The portable powered hacksaw according to claim 21 wherein said rollers are further defined as a first roller having an enlarged upper portion and lower portion engaging an upper edge, a lower edge, and a first side surface of said blade coupler, and a second roller having an enlarged middle portion engaging a second side surface of said blade coupler.

23. The portable powered hacksaw according to claim 20 including a second hacksaw blade juxtaposition to and operatively associated with said first hacksaw blade providing a reciprocal motion in relation to said first hacksaw blade.

* * * * *